United States Patent
Shibamoto

[11] 3,888,505
[45] June 10, 1975

[54] INFLATABLE VEHICLE SAFETY DEVICE

[76] Inventor: Iwao Shibamoto, No. 31-7, 2-chome, Nishi Sugamo, Tokyo, Japan

[22] Filed: Sept. 13, 1971

[21] Appl. No.: 179,973

[30] Foreign Application Priority Data
Sept. 14, 1970 Japan .................. 45-80327

[52] U.S. Cl. .................. 280/150 AB
[51] Int. Cl. .................. B60r 21/10
[58] Field of Search .......... 280/150 AB; 244/138 R; 5/348, 345; 52/2

[56] References Cited
UNITED STATES PATENTS

| | | | |
|---|---|---|---|
| 1,266,482 | 5/1918 | Kamrass | 5/348 R |
| 2,806,737 | 9/1957 | Maxwell | 280/150 AB X |
| 2,974,912 | 3/1961 | Namsick | 244/138 R |
| 3,481,625 | 12/1969 | Chute | 280/150 AB |
| 3,527,475 | 9/1970 | Carey et al. | 280/150 AB |
| 3,586,347 | 6/1971 | Carey et al. | 280/150 AB |
| 3,624,810 | 11/1971 | Hass | 280/150 AB |
| 3,632,133 | 1/1972 | Hass | 280/150 AB |
| 3,638,755 | 2/1972 | Sack | 280/150 AB |
| 3,675,942 | 7/1972 | Huber | 180/90 X |
| 3,767,225 | 10/1973 | Mazelsky | 280/150 AB |

Primary Examiner—Kenneth H. Betts
Attorney, Agent, or Firm—Haseltine, Lake & Waters

[57] ABSTRACT

A safety device comprises a bag, means provided on the bag and adapted to be inflated by fluid introduced therein under pressure to expand said bag from a folded state to its original form, openings through which the ambient air flows into the bag when said bag is expanded by virtue of the pressure differential between the interior and the exterior of said bag, means for closing said openings to seal the air introduced into said bag and means for supplying the fluid under pressure into said bag to build up the internal pressure of the bag to a level higher than the atmospheric pressure.

1 Claim, 9 Drawing Figures

PATENTED JUN 10 1975　3,888,505

SHEET 1

PATENTED JUN 10 1975　　3,888,505

SHEET 2

INFLATABLE VEHICLE SAFETY DEVICE

This invention relates to safety devices for protecting the passengers' lives from danger at the time of automobile collision, and more particularly to air bags.

So-called shock absorbing devices in which a liquefied gas is gasified or compressed air is expanded and the resulting gas is introduced into a folded bag to instantaneously inflate said bag thereby to block an abrupt movement of the passengers, have already been known. In such prior art devices, however, since the pressurized gas or compressed air is introduced into the folded bag in an amount sufficient to completely inflate the bag, the internal pressure of the passenger room when said passenger room is sealed for air conditioning rises abruptly, frequently causing damages to the eardrums of the passengers. Furthermore, since the internal pressure of the inflated bag is higher than the internal pressure of the passenger room, the inflated bag has the same effect as a hard object and injures the passengers' bodies colliding thereagainst.

The present invention contemplates the provision of a novel safety device which either eliminates or alleviate the above-described shortcomings of the conventional device.

The primary object of the present invention is to provide a safety device in which a folded bag is abruptly expanded and the ambient air is sucked into and sealed in the expanded bag, and further the internal pressure of the air sealing bag is elevated above the atmospheric pressure.

In one embodiment of the invention, the bag comprises a tube frame provided along the edges thereof and adapted to be inflated by fluid introduced therein under pressure for expanding said bag from the folded state to its original form, openings for allowing the ambient air to flow into the bag by virtue of the pressure differential between the interior and the exterior of the bag when said bag is expanded and means for closing said openings, and further comprises means for supplying fluid under pressure into said bag to build up the internal pressure of the air sealing bag to a level higher than the atmospheric pressure.

The means for supplying fluid under pressure into the bag consists of weak portions which are provided in that portion of an inflatable tube frame-constituting tube located within the bag and which can be ruptured by the pressure of the fluid introduced into said tube to provide communication between the interior of said tube and the interior of said bag.

In another embodiment of the invention, the aforesaid means consists of small holes formed in the wall of the tube frame-constituting tube. In still another embodiment, the fluid under pressure is directly supplied into the bag.

The present invention will become apparent from the following description when taken in conjunction with the accompanying drawings illustrating the embodiment thereof.

Figure 4:
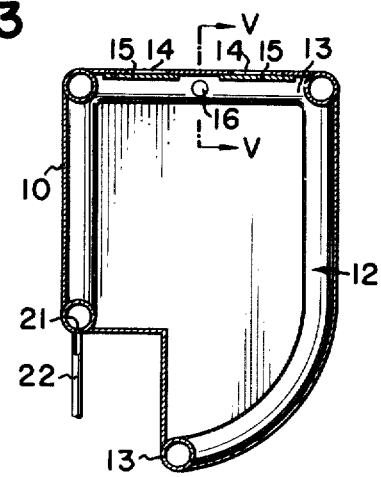
FIG. 4 is a sectional view taken on the line IV—IV of FIG. 3.

Referring to the drawings and particularly to FIGS. 1 to 5, a safety device of the present invention comprises a bag 10 made of a flexible air-impervious material and said bag is mounted in a folded state on the top of the back portion of an automobile seat 11. The bag 10 is provided along the edges thereof with an inflatable flexible tube frame 12 which is made up of tube portions 13 communicating with each other. The tube portions 13 may be formed as a part of the bag or separately from the bag and secured thereto. A plurality of openings 14 are formed in the top wall of the bag 10 and flat check valves 15 are provided on the bag each adjacent each of the openings 14, said check valve being secured to said bag at one edge thereof as shown in FIG. 4. It will be understood that the tube frame 12 is flattened when the bag is folded. The tube portions 13 constituting the tube frame 12 each have a weak wall portion 16 at a location facing the interior of the bag. This weak wall portion 16 may be formed by reducing the wall thickness of the tube portion or a thin member closing a hole formed in the tube wall.

Figure 1:
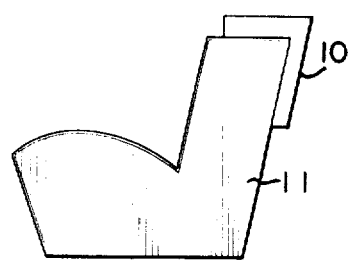
FIG. 1 is a schematic side view showing a seat of an automobile provided with the safety device according to the present invention.
Figure 2:
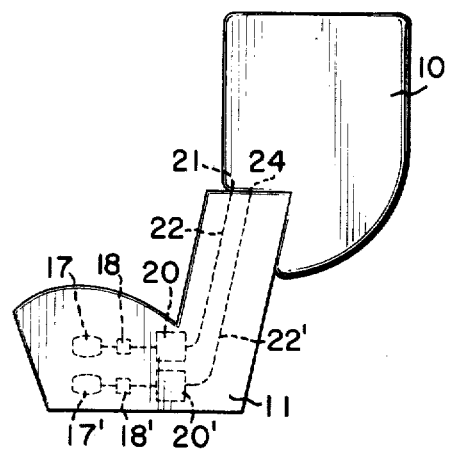
FIG. 2 is a view similar to FIG. 1 but showing the manner in which the safety device of the invention operates.
Figure 3:
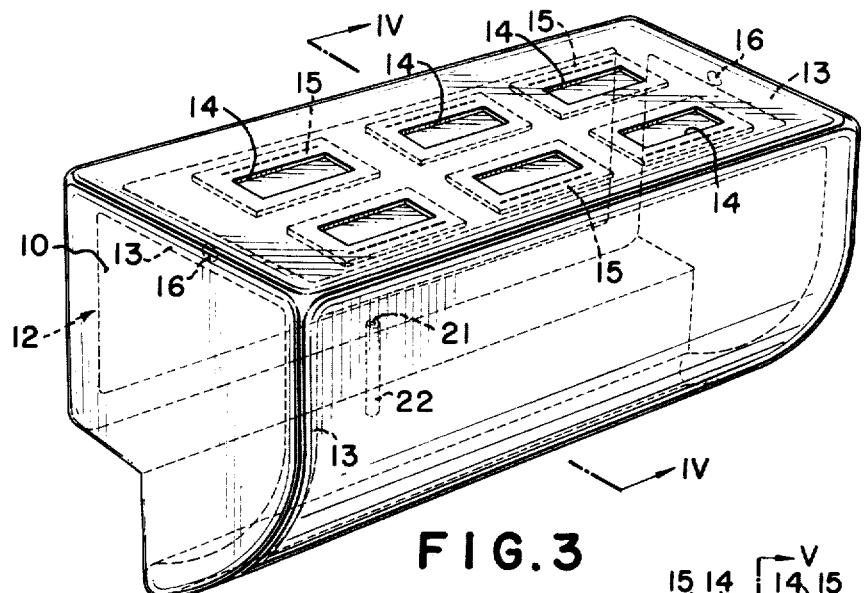
FIG. 3 is a perspective view of the safety device of the invention as viewed from the backside thereof.
Figure 5:
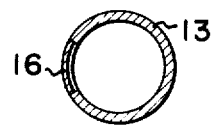
FIG. 5 is a sectional view taken on the line V—V of FIG. 4.

In FIG. 2, reference numeral 17 designates a Freon tank, and 18 designates an electromagnetic valve which is connected with a known impact signal generator or impact prediction signal generator (not shown) and adapted to be opened in response to a signal from said signal generator. Reference numeral 20 designates a Freon vaporiser which is connected through a connecting tube 22 to an inlet port 21 provided on the tube portion 13 of the tube frame 12.

In operation, when the automobile collides with another automobile or an object, the electromagnetic valve 18 is actuated and opened in response to a signal from the impact signal generator or impact prediction signal generator, and liquefied Freon in the Freon tank 17 flows through said valve into the Freon vaporiser 20 wherein the liquefied Freon is gasified to generate Freon gas. The resulting Freon gas flows through the gas inlet port 21 into the tube portions 13 of the tube frame to abruptly inflate said tube frame. As a result, the folded bag 10 is expanded into its original form, so that the ambient air in the passenger compartment of the automobile flows into said bag 10 through the air inlet openings 14 by virtue of the pressure differential between the interior and the exterior of the bag. When the gas pressure in the tube frame 12 has reached a certain level during the process of expansion of the bag 10 into its original form by the inflation of the tube frame 12, the weak wall portions 16 of the tube portions 13 are ruptured allowing part of the gas to flow into the bag from said tube frame. Thus, the internal pressure of the bag 10 rises from the atmospheric pressure to a higher pressure and thereby the check valves 15 are caused to close the air inlet openings 14 respectively. The bag with air and the gas sealed therein provides a greater shock absorbing effect than that of the conventional bags which are inflated only by gases.

Figure 6:
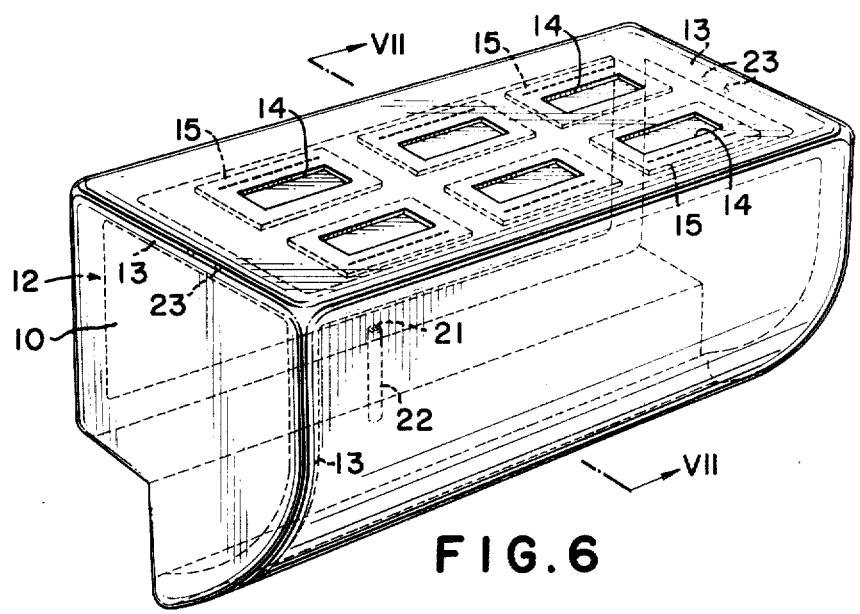
FIG. 6 is a view similar to FIG. 3 but showing another embodiment of the safety device according to the present invention.
Figure 7:
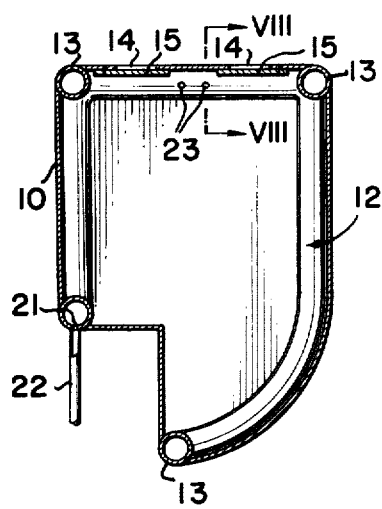
FIG. 7 is a sectional view taken on the line VII—VII of FIG. 6.
Figure 8:
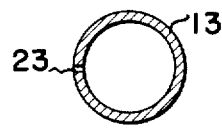
FIG. 8 is a sectional view taken on the line VIII—VIII of FIG. 7.

Referring now to FIGS. 6 to 8, there is shown another embodiment of the present invention. This embodiment is similar to the preceding embodiment with the only exception that the tube frame-constituting portions 13 are formed with small perforations 23 respectively. The small perforations 23 are formed in that portion of the tube portion 13 which faces the interior of the bag 10. Therefore, when the Freon gas is introduced into the tube frame 12 and thereby the bag 10 is expanded, the ambient air in the passenger compartment flows into the bag 10 through the openings 14 by virtue of the pressure differential between the interior and the exterior of said bag, and at the same time, the Freon gas flows into the bag through the small perforations 23 formed in the tube portions 13 of the tube frame 12. By reason of the fact that the gas under pressure is introduced into the bag in addition to the atmospheric air, the internal pressure of the bag is built up to a level higher than the atmospheric pressure.

Figure 9:
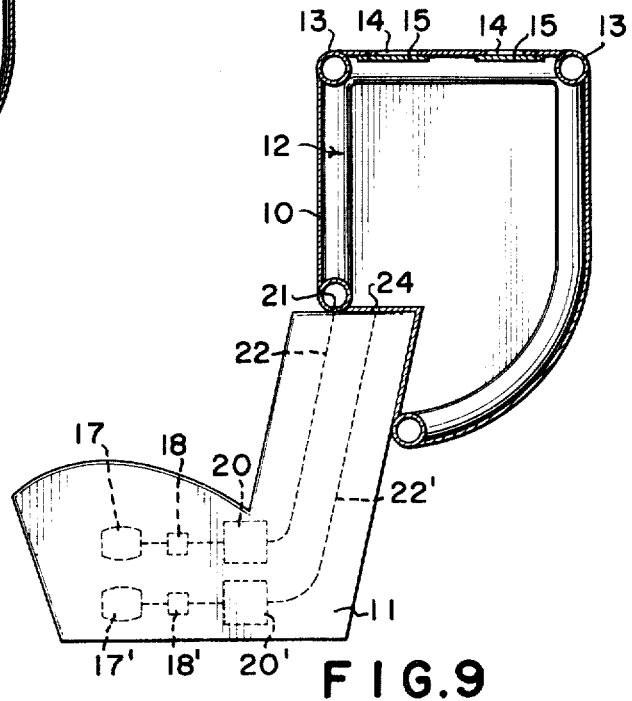
FIG. 9 is a view similar to FIG. 2 but showing still another embodiment of the safety device according to the present invention.

In FIG. 9 which shows still another embodiment of the invention, the safety device is of the type in which Freon gas is directly introduced into the bag 10. To this end, there is provided a Freon gas supply unit comprising a Freon tank 17', an electromagnetic valve 18' and a Freon vaporiser 20'. A pipe 22' leading from the Freon vaporiser 20' is connected with a gas inlet port 24 provided on the bag 10. It will be readily understood that in this embodiment, the bag 10 is expanded in the same manner as in the first embodiment and the ambient air is introduced into the bag. The electromagnetic valve 18' is opened with a certain time delay after the electromagnetic valve 18 is opened. Upon opening the electromagnetic valve 18', the liquefied Freon in the Freon tank 17' flows into the Freon vaporiser 20' wherein it is gasified. The resulting Freon gas flows into the air-containing bag 10 through the pipe 22'. Thus, the pressure inside the bag is built up and the check valves 15 close the air inlet openings 14 respectively, whereby the atmospheric air and the gas are sealed in the bag.

Although the present invention has been described herein in terms of the embodiments wherein Freon gas is used to inflate the tube frame and to be introduced into the bag, it will be understood that according to the invention air or other fluids under pressure may also be utilized.

Further, although in the embodiments described herein the tube frame is used as means for inflating the bag, it is to be understood that other means may also be employed, e.g., a space defined between an inner and an outer walls of which the bag is composed.

I claim:

1. A safety device comprising a bag having folded and expanded positions, a tubular frame secured to said bag, means for introducing a pressurized gas into said tubular frame, said tubular frame being inflatable by said gas to expand said bag from its folded state to its expanded state when the pressurized gas is introduced into said tubular frame, the expansion of said bag producing a pressure differential between the inside and outside of said bag, said bag having a wall with air passage openings for introducing ambient air into the expanded bag under said pressure differential, and check valves on said bag for closing said air passage openings to trap the thus introduced air in said bag, said tubular frame having a wall with weakened portions therein adapted to be ruptured under the pressure of the gas introduced into said tubular frame, the rupture of said weakened portions causing the pressurized gas in said inflated tubular frame to flow into said bag to build up the internal pressure of the bag to a level higher than atmospheric pressure and close said check valves to isolate the interior of the bag from the ambient atmosphere.

* * * * *